US010965609B2

(12) United States Patent
Szabó et al.

(10) Patent No.: US 10,965,609 B2
(45) Date of Patent: Mar. 30, 2021

(54) MAPPING OF SERVICE REQUIREMENTS FOR A VIRTUALIZED NETWORK ON A PACKET FLOW

(71) Applicant: Telefonaktiebolaget LM Ericsson (publ), Stockholm (SE)

(72) Inventors: Róbert Szabó, Budapest (HU); András Császár, Telki (HU); Dávid Jocha, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 227 days.

(21) Appl. No.: 15/746,376

(22) PCT Filed: Jul. 6, 2016

(86) PCT No.: PCT/EP2016/066031
§ 371 (c)(1),
(2) Date: Jan. 19, 2018

(87) PCT Pub. No.: WO2017/005813
PCT Pub. Date: Jan. 12, 2017

(65) Prior Publication Data
US 2018/0212895 A1 Jul. 26, 2018

Related U.S. Application Data

(60) Provisional application No. 62/188,974, filed on Jul. 6, 2015.

(51) Int. Cl.
*H04L 12/911* (2013.01)
*H04L 12/24* (2006.01)

(52) U.S. Cl.
CPC .......... *H04L 47/70* (2013.01); *H04L 41/0896* (2013.01); *H04L 41/12* (2013.01); *H04L 41/5041* (2013.01)

(58) Field of Classification Search
CPC ..... H04L 47/70; H04L 41/0896; H04L 41/12; H04L 41/5041; G06F 9/46
(Continued)

(56) References Cited

U.S. PATENT DOCUMENTS 5,175,800 A 12/1992 Galis et al.
2006/0080413 A1 4/2006 Oprea et al.
(Continued)

OTHER PUBLICATIONS

International Search Report and Written Opinion of the International Searching Authority, PCT/EP2016/066031, dated Oct. 19, 2016, 8 pages.
(Continued)

*Primary Examiner* — Meng Vang
(74) *Attorney, Agent, or Firm* — Patent Portfolio Builders, PLLC

(57) ABSTRACT

Certain embodiments relate to a method for assigning, by a resource orchestration entity, resources for a service carried out on a data packet flow in a multilayer network, the method comprising determining software requirements and network requirements necessary for the service wherein the software requirements and network requirements are received by the network resource orchestration entity from an upper layer through a northbound interface; determining a virtual network topology of the network with at least one virtual network entity, the virtual network entity comprising entity computing resources and entity network resources; and assigning the software requirements and the network requirements at least partially to the entity computing resources and the entity network resources.

22 Claims, 6 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2010/0254406 | A1* | 10/2010 | Youn .................. | H04L 12/4675 370/468 |
| 2012/0185846 | A1* | 7/2012 | Recio .................... | G06F 9/5077 718/1 |
| 2014/0059226 | A1* | 2/2014 | Messerli ............... | G06F 9/5072 709/226 |
| 2014/0157046 | A1* | 6/2014 | Anumalasetty ..... | G06F 11/2005 714/6.22 |
| 2015/0195249 | A1* | 7/2015 | Barda ................ | H04L 63/0236 726/13 |
| 2016/0352617 | A1* | 12/2016 | Wang ...................... | H04L 45/22 |

OTHER PUBLICATIONS

Szabó, R., ed., et al., "Unifying Cloud and Carrier Networks," Deliverable 2.2: Final Architecture (Draft) Dissemination Level PU, Version 1.0 (Nov. 15, 2014), 64 pages.
Szabó, R., et al.,"Towards Recursive Virtualization and Programming for Network and Cloud Resources," NFVRG internet-Draft, Jul. 6, 2015, <URL: http://draft-unify-nfvrg-recursive-programming-01.com> 28 pages.

\* cited by examiner

MAPPING OF SERVICE REQUIREMENTS FOR A VIRTUALIZED NETWORK ON A PACKET FLOW

CROSS REFERENCE TO RELATED APPLICATIONS

This application is a 35 U.S.C. § 371 national stage application of PCT International Application No. PCT/EP2016/066031 filed on Jul. 6, 2016, which in turns claims domestic priority to U.S. Provisional Patent Application No. 62/188,974, filed on Jul. 6, 2015, the disclosures and content of which are incorporated by reference herein in their entirety.

This invention relates to a method for determining resources for a service carried out in a network by a resource orchestration entity and to the corresponding resource orchestration entity.

The work leading to this invention has received funding from the European Union Seventh Framework Programme (FP7/2007-2013) under grant agreement n° 619609 and project name UNIFY.

INTRODUCTION

In a mobile communications environment network functions are known which carry out services on a data packet flow or apply services to a data packet flow. The design of network functions providing the services is a time-consuming task and possibilities are investigated how to reduce service creation times. Furthermore, software defined networks (SDN) are known which target at breaking vertical integration of network data and control planes and to use a logically centralized control plane entity used for network configuration and policy enforcement.

Furthermore, cloud services and cloud networking receive enormous attraction from providers and customers. For customers cloud services mean reduced costs for obtaining and managing hardware while enabling more flexible control of resources. This is enabled by virtualizing, e.g. processing, storage and networking resources of the provider. For providers cloud services represent an opportunity to offer new services with highly efficiently used hardware enabling resource sharing by virtualized appliances.

Network service providers are building data centers at some of their sites. Data centers are the enablers for cloud services and currently the only well-programmable part of the infrastructure housing mostly generic purpose hardware. Under the expression "Telco Cloud" a trend is described about virtualizing networking and telecommunication functions and moving these to the cloud infrastructure of the network service provider.

Although cloud computing and networking have been two active fields of research, there is currently little integration between the networking assets and the data centers of telecommunication providers.

A consortium under the name EU FP7 integrated project "Unify" was founded to provide solutions to provide flexible service creation in the context of unified cloud and carrier networks.

The Unify architecture comprises in general three layers, a service layer (SL), the orchestration layer (OL) and the infrastructure layer (IL). Virtualizers are responsible for the allocation of abstract resources and capabilities to particular consumers. In this context a Big Switch with Big Software (BiS-BiS) is defined which is the virtualization of a forwarding element (FE) connected with a compute node (CN). The BiS-BiS is capable of running network functions and connecting them to the forwarding element. A service access point (SAP) is a service provider's physical or logical port which represents a customer's point of presence, access to internal services or exchange points to other providers.

FIG. 1 shows an example multi-layer hierarchy of a Bis-Bis-based virtualization. FIG. 1 depicts different domains such as Unify Domain-1 10 and a second domain 20 named Unify Domain-2. Above domains 10, 20 a Unify Domain-0 30 is provided which is connected to a Unify Domain-3 40. Two users or tenants 50 are shown to be connected to service management/adaption function 36. The different domains contain a resource orchestrator, such as resource orchestrator 11, 21 and 31, which is responsible for allocating resources for the application of a service by a network function. Below the resource orchestrators an infrastructure layer 12 and 22 is provided in the lowest layer which comprises the resources. Furthermore, different virtualizers 13, 23, 33 and 34 are shown, wherein the virtualizers are responsible for the allocation of abstract resources and capabilities, wherein the virtualized views are vendor, technology and domain agnostic and contain the resources at compute and storage network abstraction and capabilities. The virtualizer of Domain-1 or of Domain-2 shows a virtual view of the domain's infrastructure to the upper layer, in this case Domain-0. In Domain-0 the Virtualizer-0 35 shows another virtual view of the combined Domains-1 and -2. The resource orchestrator is working on the view from Virtualizer-0.

A view of a domain is illustrated in FIG. 2 which contains several BiS-BiS nodes 70, 80, 90, links between the nodes, wherein the link between the nodes is obtained by ports, such as ports 71, 72, 81, 82 and service access points (SAP) 60, 61, 62.

Up to now no solution exists for how to map service requirements against the virtual network entities and their capabilities in an environment as the one described above.

SUMMARY

Accordingly, a need exists to provide a possibility to map the network and computing requirements of a service request carried out on data packet flow to the virtual network environment.

This need, and others, is met by the features of some of the embodiments described herein. For the sake of brevity and clarity, not every feature of every embodiment contemplated by the inventors or encompassed by the scope of the invention is necessarily disclosed herein.

According to one aspect, a method for assigning, by a resource orchestration entity, resources for a service carried out on the data packet flow in a multilayer network is provided. The software requirements and network requirements necessary for the service are determined wherein the software requirements and network requirements are received by the network resource orchestration entity from an upper layer through a northbound interface. Furthermore, a virtual network topology with at least one virtual network entity comprising entity computing resources and entity network resources is determined. The software requirements and the network requirements are at least partially assigned to the entity computing resources and the entity network resources.

Furthermore, a corresponding resource orchestration entity is provided comprising a processing unit configured to determine software requirements and network requirements or/and an interface configured to receive software requirements and network requirements from an upper layer, wherein the at least one processing entity is configured to determine a virtual topology with at least one virtual network entity which comprises the entity computing resources and entity network resources. The at least one processing unit is configured to assign the software requirements and network requirements at least partially to the entity computing resources and entity network resources.

Further, a computer program is provided, comprising program code to be executed by at least one processing unit of a resource orchestration entity, wherein execution of the program code causes the at least one processing unit to execute a method like the one described herein. Said computer program may be carried on or by a carrier, which carrier may be an electronic signal, optical signal, radio signal, or computer readable storage medium, particularly a non-transitory computer readable storage medium like e.g. semiconductor memory, magnetic or magneto-optic disc or harddisk drive, optical storage medium like CD-ROM, DVD or the like.

It is to be understood that the features explained above or explained in more detail below can be used not only in the respective combinations indicated, but also in other combinations or in isolation without departing from the scope of the present invention. The features of the different aspects and embodiments may be combined with each other in other embodiments, unless explicitly mentioned otherwise.

BRIEF DESCRIPTION OF THE DRAWINGS

The foregoing and additional features and effects of the invention will become apparent from the following detailed description when read in conjunction with the accompanying drawings in which like reference numerals refer to like elements.

DETAILED DESCRIPTION

Figure 1:
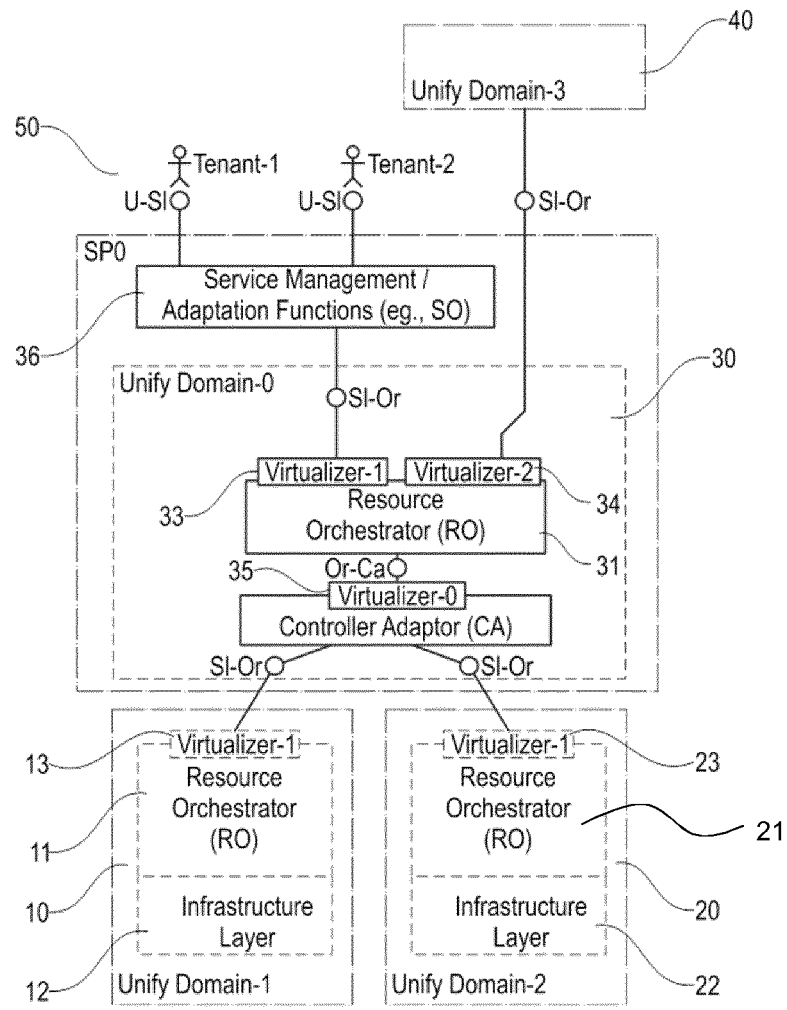
FIG. 1 illustrates a schematic architectural view of a virtualized network environment.
Figure 2:
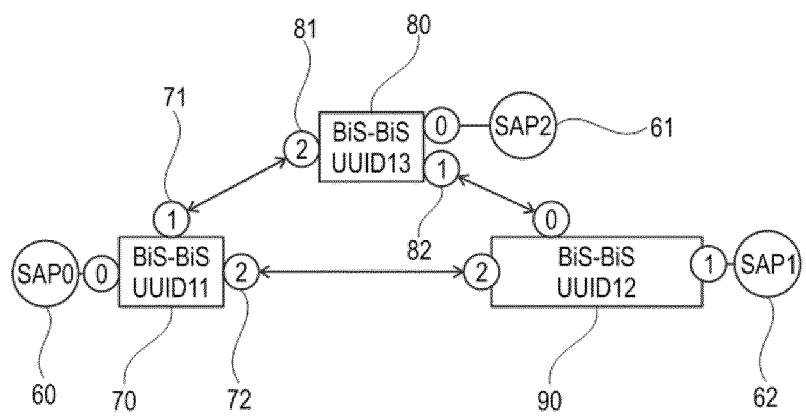
FIG. 2 schematically illustrates a view of a domain virtualization.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between the functional blocks, devices, components or physical or functional units shown in the drawings or described herein may also be implemented by an indirect connection or coupling. A coupling between components may be established over a wireless or wired connection. Functional blocks may be implemented in hardware, firmware, software or a combination thereof.

In the following it is described how a full resource allocation for the application of a service and its components even at the lowest infrastructure layer in a multi-level (hierarchical) computer network virtualization framework is obtained.

A method is provided for a resource orchestration entity to exchange information for a joint software and network recursive resource orchestration. The method comprises inter alia the step of reporting the infrastructure and the mapping of the network functions and requirements to the infrastructure.

The recursive resource orchestration for software and network can comprise the steps of resolving service requirements to software and networking resource allocation. As an alternative or in addition it may comprise the step of resolving a service requirement to a joint resource requirement or it contains the step of resolving resource requirements to resource allocation. The steps are carried out to arrive at a full resource allocation at the end of the recursion. Recursive in the present context means that it is recursive between layers. Each layer has a northbound interface to an upper layer and a southbound interface to a lower layer.

In the present context recursive means that the northbound and the southbound interface are the same, i.e. their specification or definition is the same from a structural point of view, e.g. regarding format and/or content of messages or parameters. This could also mean that there is only one interface which functions or is used as northbound and southbound selectively or alternatively or simultaneously. In this case, any number of layers could be placed one on top of the other.

Figure 3:
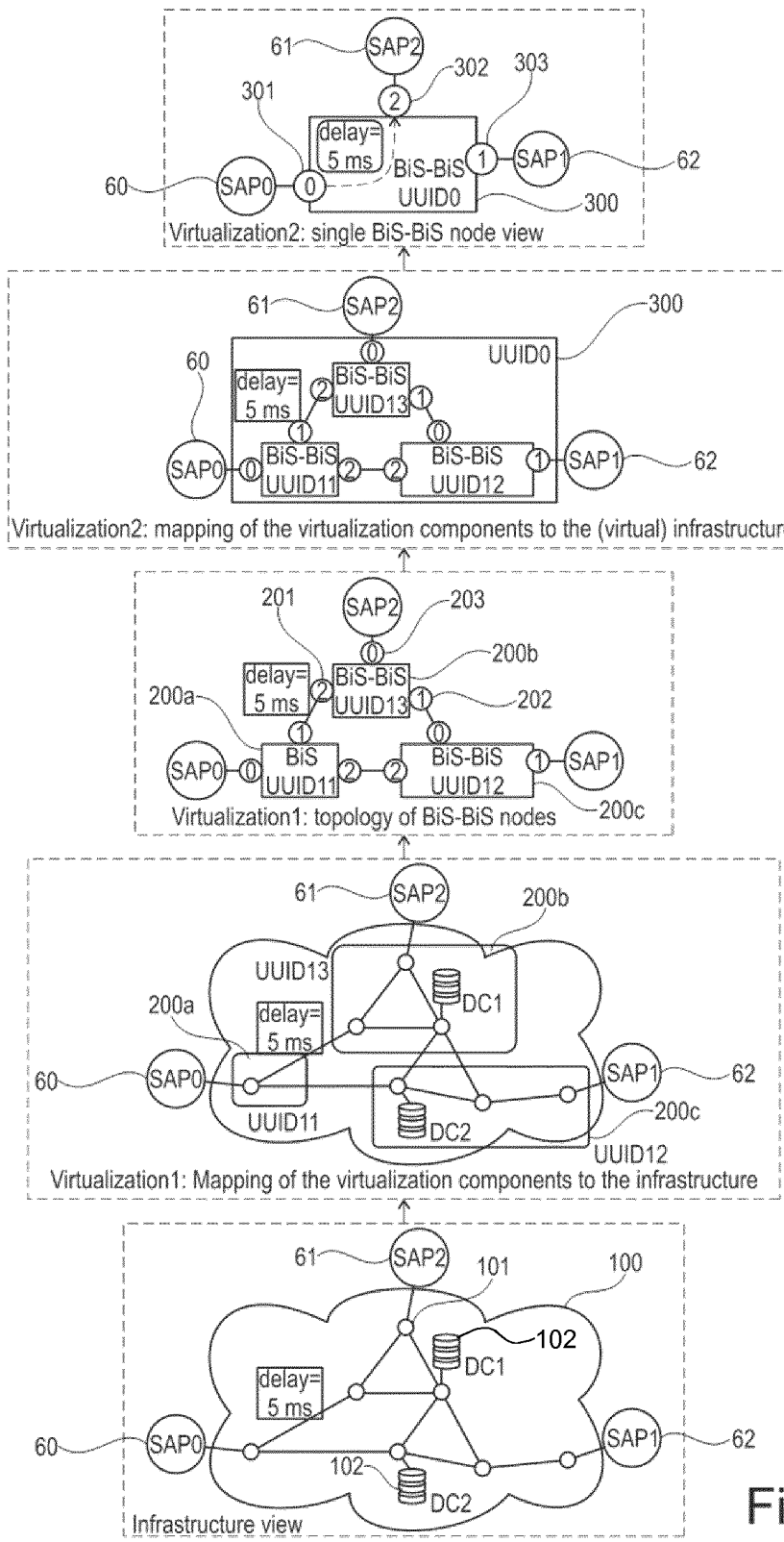
FIG. 3 illustrates a schematic infrastructure virtualization from the infrastructure view to a virtualization with a single virtual network entity.

FIG. 3 shows an example of how the infrastructure is presented by the virtualizers in a multi-layer scenario as shown in FIG. 1. FIG. 3 shows at the bottom an infrastructure view of a network 100 comprising different network nodes 101 and two data centers DC1, DC2 102 together with the service access points 60, 61 and 62. For the generation of the virtualized view virtualized network entities are mapped to the infrastructure. In the embodiment shown three virtual network entities 200a-200c are generated. As shown by the third figure of FIG. 3 from below, the three virtual network entities 200a-200c build a topology of the virtual network in which the different virtual network entities are connected to one another using ports, such as port 201, 202, 203 shown at the virtual network entity 200b which is named BiS-BiS UUID13 in the embodiment of FIG. 3. As shown in the second figure from above of FIG. 3, this virtual network structure comprising the three virtual network entities can be further adapted by generating a further or second virtualization in which the already virtualized three virtual network entities are virtualized to a single virtual network entity 300. Thus, we arrive at the end at a single virtual network entity 300 which is connected to the three service access points via corresponding ports 301, 302 and 303. This single node view may for example be presented to the next higher layer so that the layer below indicates to the higher layer that it comprises a single virtual network entity 300, whereas the lower layer actually knows that behind the single network view with network node 300 three other virtual network nodes 200a-200c are present. Summarizing, as shown in FIG. 3 the physical infrastructure comprising several network nodes, data centers and links is abstracted to a three-node view by a virtualizer. Then this three-node view is further abstracted to a single-node view by an upper layer virtualizer.

Figure 4:
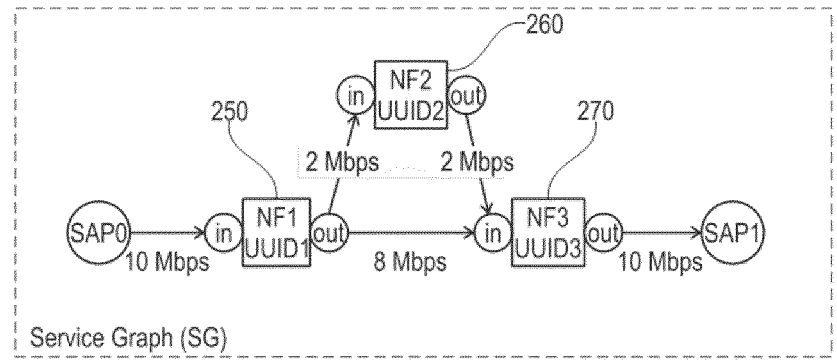
FIG. 4 illustrates a schematic view of an example service request involving different network functions.

FIG. 4 shows an example service request involving three network functions (NF). A data packet flow from SAP0 with 10 Mbps is fed to a first network function 250 which may be a traffic inspection entity. Part of the traffic, such as 2 Mbps, is transmitted to network function 260, which may by way of example be an HTTP processing node, so that the HTTP traffic part of the 10 Mbps are transmitted to network function 260, in the example shown 2 Mbps. The rest of the data, 8 Mbps, is directly transmitted to network function 270 where the traffic is combined before it is output to SAP1.

Figure 5:
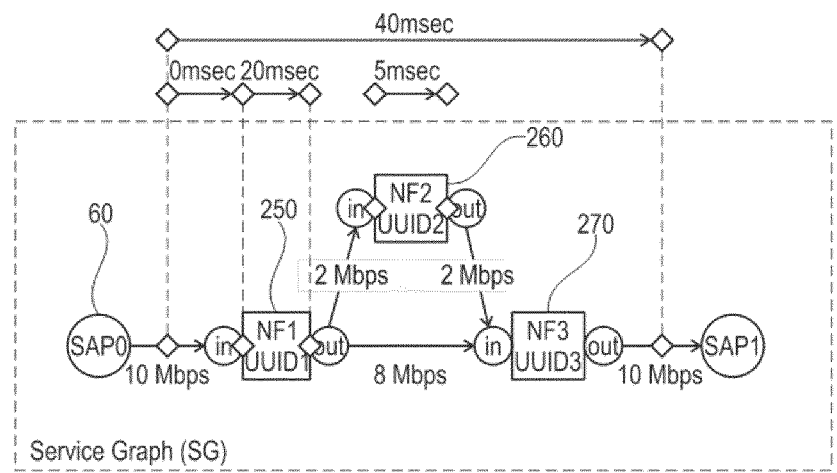
FIG. 5 illustrates a schematic service graph indicating some network requirements necessary for the application of the service.

FIG. 5 shows a service graph of the request of FIG. 4 with the requirements, such as bandwidth and delay requirements, for the whole service and for some of the components. The example will be used throughout the rest of the document. As indicated by the service graph, the data flow of the 10 Mbps enters the network and should arrive with the lowest possible delay at the first network function 250. Within network function 250 a processing is carried out which should not take longer than 20 ms. FIG. 5 furthermore indicates that the processing at network function 260 will take 5 ms and that the total time from the entrance to the exit is 40 ms.

The service request such as the service request of FIG. 5 having software requirements and network requirements has to be mapped to the virtualization views, e.g. to the view as shown in FIG. 3. However, some of the constraints cannot be or may not be necessarily mapped to the infrastructure view due to the lack of details (information hiding with the virtualization) or purpose to delegate the final orchestration decision. By way of example as mentioned above in FIG. 3 the top virtualizer shows a single-node view, whereas the bottom one has a three-node view. This mapping of the service request to the topology of the virtual network is carried out by a resource orchestration entity as will be explained in more detail below.

The mapping of software and networking requirements should match the corresponding software and network resources and should be in pair with them. The software resources, such as compute and storage resources, are assigned to the virtual network nodes, the BiS-BiS nodes. The characteristics or capacities of the networking resources, such as bandwidth and delay, are assigned to the external links among different virtual network nodes or components, by way of example in the bottom part of FIG. 3 the link between UUID11 and UUID13. Furthermore, the networking resources are assigned between a port pair of a virtual network entity. The allocation of network functions to the virtual network entities introduces additional ports representing the point of attachment of the network function to the virtual network entity.

Figures 6A, 6B:
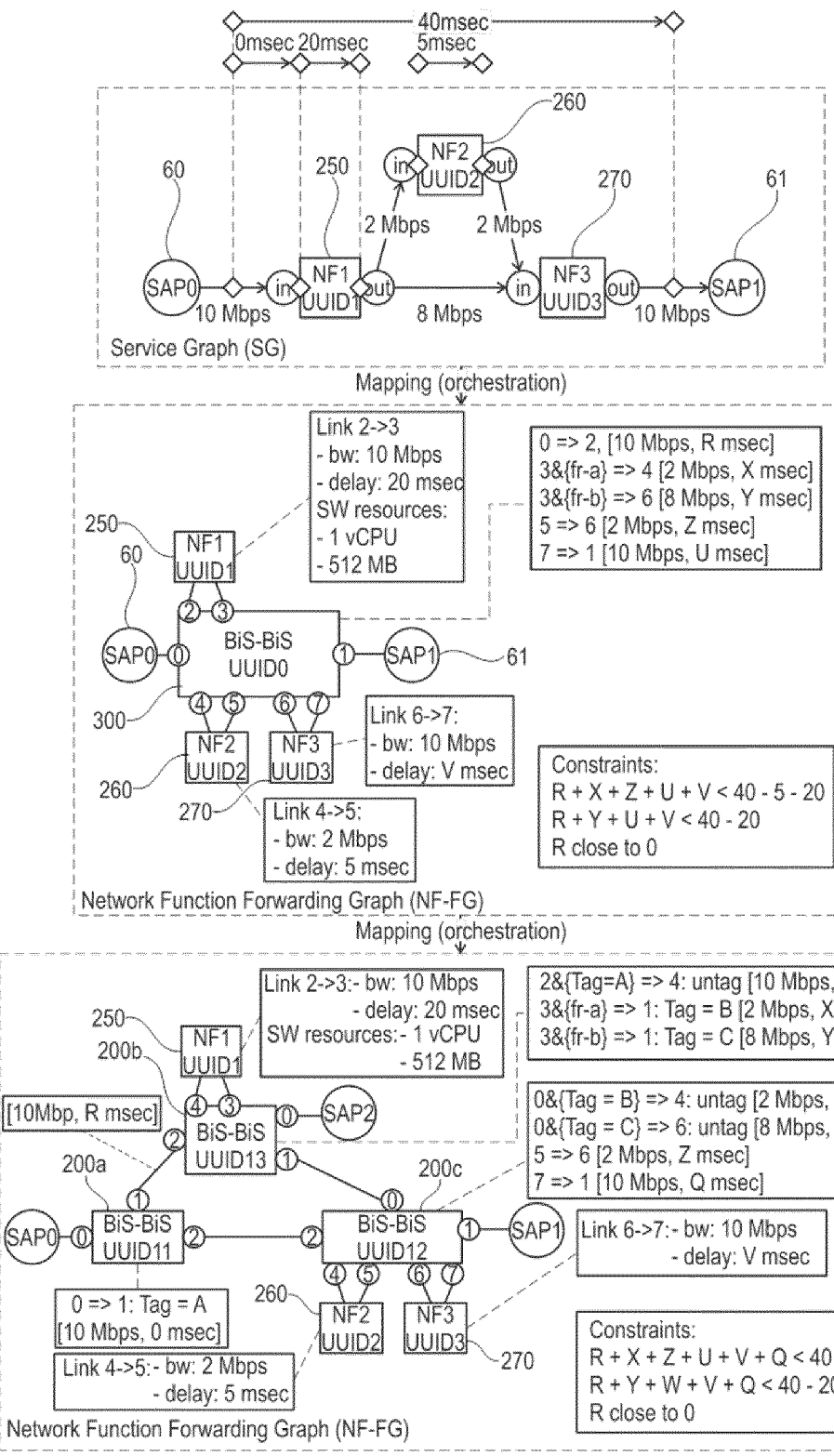
FIGS. 6a and 6b illustrate a schematic mapping of service requirements to a virtualized network view.

This is explained in further detail in connection with FIGS. 6a and 6b. FIG. 6a shows the service graph indicating inter alia the network requirements as it was shown in FIG. 5. The mapping to the virtual single node environment is shown in the lower part of FIG. 6a. The service access point 60 from which the data packet traffic arrives is connected to the single node virtual network entity 300. As shown in FIG. 6a, the network function 250 is attached to the virtual network entity 300 via the two ports 2 and 3. Furthermore, the software and network requirements are shown in the table linked to network function 1, where it is indicated that a bandwidth of 10 Mbps has to be processed in a delay of 20 ms. Furthermore, software resources may be assigned such as that one virtual CPU is needed with 512 MB RAM. The information about the software resources may be obtained by querying a table from where it can be deduced that for the given bandwidth and the given delay the software components as indicated may be sufficient to provide the required processing. Furthermore, flow rules are indicated for the virtual network node 300 itself such as the flow from port 0 where the flow enters the virtual network node to port 2 should be R ms, the R ms being introduced as 0 ms and can be hardly implemented. Furthermore, information is provided that the traffic should be split from port 3 as part of the traffic being transmitted to port 4 and the other part being transmitted to port 6 again with a certain delay in ms. As far as network function 260 is concerned, the flow rule is present indicating how the flow should take place between ports 4 and 5. As can be deduced from the service graph in the upper part of FIG. 3, the delay for processing within network function 260 is 5 ms and the arrived bandwidth is 2 Mbps. As far as network function 270 is concerned, again a bandwidth and delay is indicated as a flow rule.

Furthermore, some global constraints, or global network requirements, are given indicating that the total delay needed for the transmission has to be smaller than the total delay minus the delay needed for the processing in NF1 and NF2 and that the delay from the entrance to network function 250 should be close to 0, as is shown in the lower right table of FIG. 6a, titled "Constraints". This table gives, as an example, the requirement that the sum of R (flow time from virtual network entrance port 0 to NF1 entrance port 2), X (flow time from NF1 exit port 3 to NF2 entrance port 4), Z (flow time from NF2 exit port 5 to NF3 entrance port 6), V (delay/processing time in NF3) and U (flow time from NF3 exit port 7 to virtual network exit port 1) is smaller than the global requirement of 40 ms (for the chain through the whole virtual network, i.e. from virtual network entrance port 0 to virtual network exit port 1) minus the delay/processing times of NF1 (20 ms) and NF2 (5 ms).

In FIG. 6b the virtual network view in the lower layer is shown comprising the three virtual network entities 200a-200c, wherein the network functions 250, 260 and 270 are again attached to the different virtual network entities. As can be seen, the flow rules for the network function stay the same, wherein additional rules are assigned to the virtual network entities 200a-200c. By way of example, as can be seen from the virtual network entity 200b, the single flow arriving having the 10 Mbps bandwidth has to be divided in two different flows, wherein the tagging is carried out for each of the two separate flows, so that the different flows can be distinguished. In the same way the flow entering the network is tagged at the virtual network entity 200a before it is sent to the virtual network entity 200b. At network 200c the two network functions 260 and 270 are attached via the corresponding port pairs. The flow rules indicate in detail the delay from one port to another port such as from port 0 to port 4 for one flow part and from port 0 to port 6 for the other flow part. Again as in the one point view some general constraints are given which are indicated in the right below corner.

As can be seen from the above explanations of FIGS. 6a and 6b, the network and resource requirements of the requested service are mapped to network resources and to software resources. As far as the network resources are concerned, the resource requirements such as delay and bandwidth are mapped to network resources or ports within a virtual network node such as a BiS-BiS from an external port to a port of a network function, by way of example FIG. 6b the virtual network entity 200c between port 0 and port 4 or in FIG. 6a at virtual network entity 300 between port 0 and port 2. Furthermore, the resource requirements are mapped from a port of a network function to a port of another network function. This is shown by a network component 200c between ports 5 and 6. Furthermore, the resource requirements are mapped to the network resources from a port of a network function to an external port, as shown in FIG. 6b for component 200c from port 7 to port 1.

Furthermore, the resource requirements are mapped to network resources, such as delay and bandwidth, within a network function, such as for each in-port and for each out-port of a network function via which the network function is attached to the virtual network entity, e.g. for component 200c between ports 4 and 5.

The network requirements and resource requirements are translated into rules which are then assigned to the virtual network entity such as the BiS-BiS (not shown in FIG. 6a or 6b). As explained above, some of the requirements, here the network requirements can be assigned between an infrastructure port of a BiS-BiS node and a port of network function and is reflected in the flow rules valid between the corresponding ports. Furthermore, some of the software or network requirements can be assigned between the two ports via which a single network function is attached to the BiS-BiS node. This is then reflected by the requirements assigned to the network function. Furthermore, network requirements may be assigned between the ports of different network functions, again reflected in the flow rules valid between the corresponding ports. Furthermore, the software or network requirements can be assigned to different ports of a virtual network entity, e.g. to ports within the same virtual network entity, which is again reflected in flow rules. Furthermore, the software and network requirements can be assigned to link ports which connect different virtual network entities. The requirements can be directly linked to this link port.

Additionally, the software resources are mapped to each network function, such as in FIG. 6b component 200b and network function 250. Network resources can include parameters such as bandwidth, delay, priority, preemption and/or traffic class.

Software requirements may include parameters such as computing resources, such as CPU, storage, such as memory/disk I/O.

Beyond the explicit allocation of resources it is possible to allow a variable binding to any of the resource instances mentioned above. Constraints related to algebraic operations, min/max and alike can be used to formulate unresolved but global constraints or global network requirements which are shown by way of example in the lower right part of FIG. 6a or 6b.

As explained above in detail FIGS. 6a and 6b show the recursive mapping of the service graph with the requirements presented in FIG. 5, wherein explicit resource assignment is shown and variable binding to resources and global constraints resp. global network requirements, such as the expression that the delay is to be smaller than the sum of the different delay variables. As indicated above, the delay requirement of 0 ms delay is interpreted to be "as close as possible", so that a variable such as delay "R" is allocated to this delay so that it can be included into the sum constraint, wherein the constraint could be to minimize R. For the description of network resources such as delay and bandwidth within a virtual network entity it is proposed to extend the open flow like forwarding rules deployed to virtual network entities with fields containing requirements for the given entry like bandwidth and delay. The following rule comprises a matching rule and a corresponding action.

Figure 7:
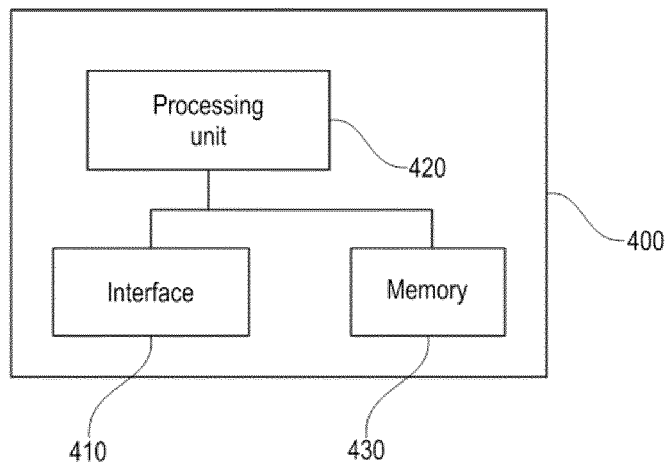
FIG. 7 illustrates an architectural view of a resource orchestration entity configured to determine the resources in a virtual network needed for the application of a service.

FIG. 7 shows a schematic architectural view of a resource orchestration entity 400 which may be implemented in the multilayer hierarchy as discussed above in connection with FIG. 1, wherein the resource orchestration entity 400 could play the role of any of the resource orchestrators 31, 11 or 21 of FIG. 1. The component of resource orchestration unit 400 may work together in order to provide any of the features and functionality disclosed herein. It should be understood that the functional components shown in FIG. 7 are merely schematic and that the resource orchestration entity may actually include further components, which, for the sake of clarity, have not been illustrated.

The components of resource orchestration entity 400 are depicted as single boxes located within a single larger box. In practice however, a resource orchestration entity may comprise multiple different physical components that make up a single illustrated component (e.g., interface 410 may comprise terminals for coupling wires for a wired connection and a radio transceiver for a wireless connection). Similarly, resource orchestration entity 400 may be composed of multiple physically separate components, which may each have their own respective processing unit, memory, and interface components. In certain scenarios in which resource orchestration entity 400 comprises multiple separate components, one or more of the separate components may be shared among multiple resource orchestration entities.

Resource orchestration entity 400 comprises interface 410 via which the resource orchestration entity can communicate with other entities. The interface can be configured to transmit control messages or user data and can be configured to receive control messages or user data from other entities. The interface can incorporate the northbound interface via which the resource orchestration entity provided in one of the layers receives information from the layer above, the interface further representing southbound interface via which information is received from a lower layer. In certain embodiments, interface 410 may be used in the wired or wireless communication of signalling and/or data between resource orchestration entity 400 and other components or devices, including both physical and virtual devices, entities, and/or components. For example, interface 410 may perform any formatting, coding, or translating that may be needed to allow resource orchestration entity 400 to send and receive data up, or down a layer. In some embodiments, interface 410 may also include a radio transmitter and/or receiver that may be coupled to or a part of an antenna. The radio may receive digital data that is to be sent out to other resource orchestration entities or network nodes via a wireless connection. The radio may convert the digital data into a radio signal having the appropriate channel and bandwidth parameters.

Resource orchestration entity 400 may further include processing unit 420 coupled to interface 410 and memory 430. Processing unit 420 may comprise one or more processors and is responsible for the operation of the resource orchestration entity and can carry out inter alia instructions stored in memory 430. Processing unit 420 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other components of resource orchestration entity 400, such as memory 430, resource orchestration entity functionality. For example, processing unit 420 may execute instructions stored in memory 430. Such functionality may include providing any of the features or benefits disclosed herein.

Resource orchestration entity 400 also may include memory 430. Memory 430 can include a read-only memory, a random access memory, a mass storage or the like.

Memory 430 may comprise any form of volatile or non-volatile non-transitory computer readable memory including, without limitation, persistent storage, solid state memory, remotely mounted memory, magnetic media, optical media, random access memory (RAM), read-only memory (ROM), removable media, or any other suitable local or remote memory component. The memory can furthermore include suitable configured program codes to be executed by the processing unit 420 so as to implement the above described functionalities in which the resource orchestration entity is involved. Memory 430 may store any suitable instructions, data or information, including software and encoded logic, utilized by resource orchestration entity 400

In some embodiments, the components described above may be used to implement one or more functional modules used by resource orchestration entity 400. The functional modules may comprise software, computer programs, subroutines, libraries, source code, or any other form of executable instructions that are run by, for example, a processor. In general terms, each functional module may be implemented in hardware and/or in software. Preferably, one or more or all functional modules may be implemented by processing unit 420, possibly in cooperation with memory 430. Processing unit 420 and memory 430 may thus be arranged to allow processing unit 420 to fetch instructions from memory 430 and execute the fetched instructions to allow the respective functional module to perform any features or functions disclosed herein. The modules may further be configured to perform other functions or steps not explicitly described herein but which would be within the knowledge of a person skilled in the art.

As described above, certain embodiments of the invention provide a resource orchestration entity comprising a processing unit and a memory, said memory containing instructions executable by the processing unit, whereby the resource orchestration entity is operative to determine software requirements and network requirements necessary for the service, wherein the software requirements and the network requirements may be received by the network resource orchestration entity from an upper layer through a northbound interface. Furthermore, it is operative to determine a virtual network topology with at least one virtual network entity comprising entity computing resources and entity network resources. Furthermore, it is operative to assign the software requirements and network requirements at least partially to the entity computing resources and entity network resources.

Furthermore, the resource orchestration entity can be provided comprising a first module configured to determine software requirements and network requirements necessary for the service, wherein the software requirements and network requirements may be received by the resource orchestration entity from an upper layer. A second module is provided which may determine a virtual network topology with at least one virtual network entity comprising entity computing resources and entity network resources, assigning the software requirements and the network requirements at least partially to the entity computing resources and entity network resources.

In other words, the resource orchestration entity is provided comprising means for determining software requirements and network requirements necessary for the service, wherein the software requirements and the network requirements may be received by the network resource orchestration entity from an upper layer. Furthermore, means are provided determining a virtual network topology of the network with at least one virtual network entity comprising entity computing resources and entity network resources. Furthermore, means are provided for assigning the software requirements and the network requirements at least partially to the entity computing resources and entity network resources.

It is noted in this respect that the resource orchestration entity may determine the software requirements and network requirements in different ways; this may be done based on information available to the resource orchestration entity by being stored internally or by being received from one or more sources. Particularly, the necessary information may be received via a northbound interface from an upper layer. It may be that the stored and/or received information is complete and may directly be used for assigning the software and network requirements to the entity computing and network resources, or it may require some further processing in order to determine the software and network requirements to be assigned to the entity computing and network resources.

Figure 8:
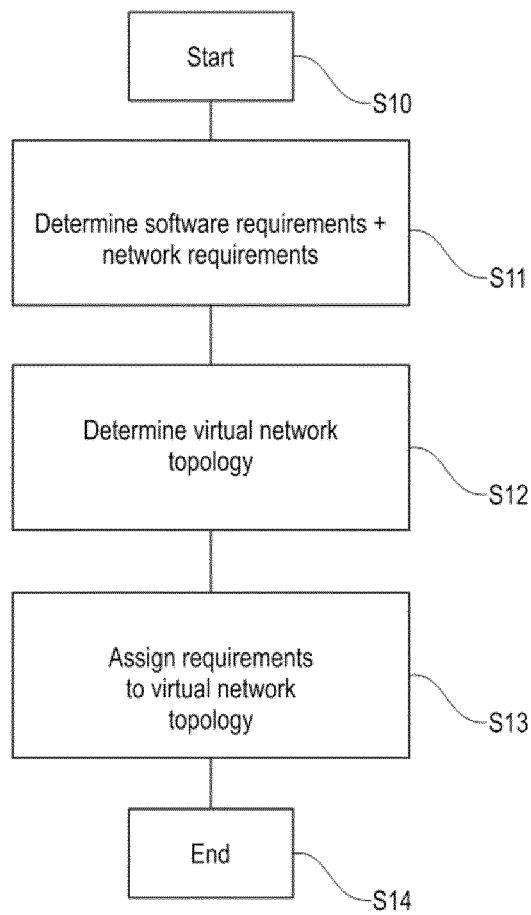
FIG. 8 illustrates a flowchart comprising the steps carried out by the resource orchestration entity of FIG. 7 to determine the resources.

FIG. 8 shows a schematic view of a flow chart carried out by a resource orchestration entity. The method starts in step S10. In step S11, the software requirements and the network requirements are determined. This can happen, as discussed above by receiving the network requirements via a northbound interface from the layer above. Furthermore, the virtual network topology with the at least one virtual network entity is determined in step S12. By way of example, the virtual network entity comprising the entity computing resources and entity network resources as shown inter alia in FIG. 3 can be determined. In step S13, the software and network requirements are assigned at least partially to the entity computing resources and entity network resources. The method ends in step S14.

Figure 9:
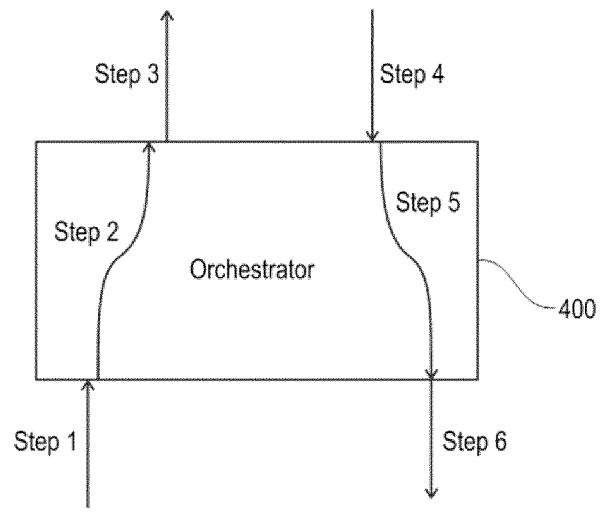
FIG. 9 shows a message flow occurring at the resource orchestration entity for the resource determination.

FIG. 9 shows a message flow occurring at a resource orchestration entity 400. In step 1, the resource orchestration entity can receive from a lower layer via a southbound interface (not shown) a view of the available network and software resources in the form of a virtual network view. The network view can be a topology of single virtual network entity as shown in the upper part of FIG. 3 or can be a topology with several virtual network entities such as shown in the middle of FIG. 3 including the three BiS-BiS nodes. In step 2, the resource orchestration entity can create a virtual view of the underlying resources as a topology of one virtual network entity or a topology of several virtual network entities. By way of example, entity 400 may receive the topology view including the three BiS-BiS nodes and may generate a single node view such as the one shown in the upper part of FIG. 3. This virtual network view may be provided to each of the users which are shown inter alia in FIG. 1. In step 3, the created virtual view topology is then provided to the upper layer via the northbound interface (not shown) to the north users. In step 4, the service description with the software requirements and network requirements are received via the northbound interface. The service description received comprises different parameters, such as software requirements and network requirements, which are shown inter alia partly in FIG. 5. In step 5, the software requirements and the network requirements are assigned to the entity computing resources and the entity network resources of the virtual network entity. Some of the software and network requirements are directly assigned either to the entity computing resources or entity network resources. Other requirements are not directly assigned to one of the entity resources but are assigned as global requirements as shown in the right lower part of FIGS. 6a and 6b. Furthermore, it should be noted that a software requirement is not necessarily only assigned to an entity computing resource and a network requirement is not solely assigned to an entity network resource. It is possible that a software requirement is also partially assigned to an entity network resource or a network requirement may be partially assigned to an entity computing resource. In step 6, the service description including the allocated software network requirements are then either transmitted to a lower layer via the southbound interface or the resources are directly allocated.

Figure 10:
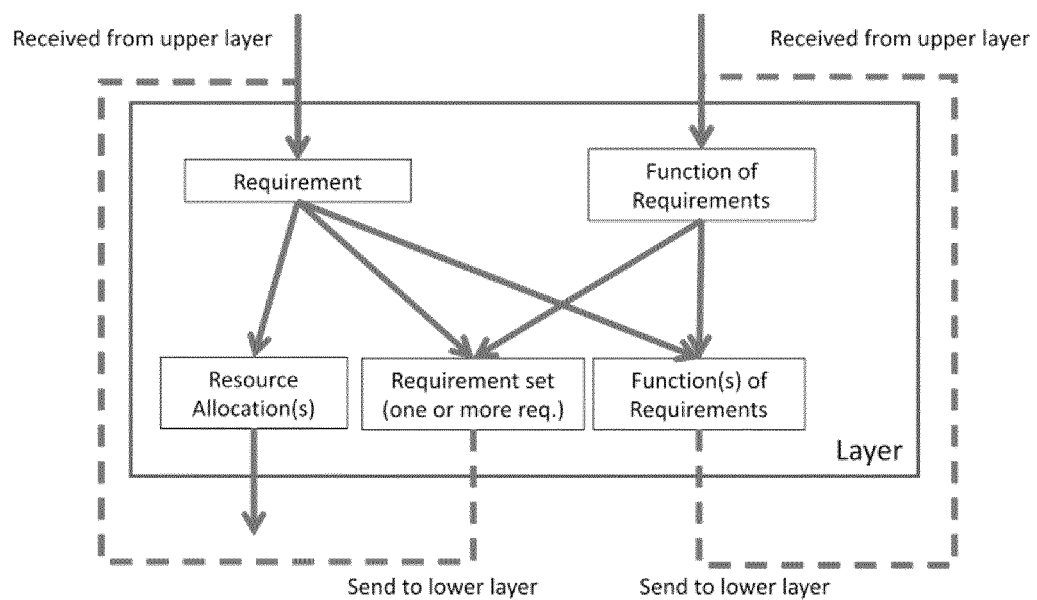
FIG. 10 shows a diagram describing the handling of requirements at the resource orchestration entity.

FIG. 10 explains how a requirement or function(s) of requirements, such as a software requirement or a network requirement is handled. The requirement is received from an upper layer and as shown in the left part of FIG. 10 a resource may be directly allocated. This means that the requirement is directly mapped to a flow rule or a software requirement and assigned to one network function or one port as discussed above in FIG. 6. As a further option, a software network requirement is translated into a global requirement, i.e., function(s) of requirements (or requirement of function of parameters), or the requirement is kept per se and the requirement is transmitted to a lower layer as indicated by the dashed line running from the requirement back to the starting requirement.

As a further option, the requirement may be a requirement set. The requirement set can contain a plurality of requirements, e.g. for different ports or for different network functions, and can be again transferred to the lower layer.

A function(s) of requirements may be received from the upper layer, where a function is expressed as a function or a general rule, e.g. the general constraint shown in FIG. 6a or 6b, where the sum of the delays has to be smaller than the overall delay. This function of requirement can then be split into a requirement set where the functions are separated into different requirements and can then be again transferred to the lower layer. Furthermore, the function can be translated into one or several functions of requirements and transferred to the lower layer.

From the above discussion, some general conclusions can be drawn. The step of assigning the software requirements and the network requirements can comprise the step of determining flow rules for the network entity resources of the virtual network entity needed for carrying out the service. The determined flow rules then contain at least some of the determined network requirements. This was explained above in connection with FIG. 6a where the different network requirements such as bandwidth and delay are assigned of the different BiS-BiS nodes shown in FIG. 6.

Furthermore, at least one network function can be connected to the virtual network entity. Assigning software requirements and network requirements can comprise the step of assigning the software requirements at least partially to the at least one network function. As explained above, in connection with FIG. 6, one network requirement is assigned to network function 250.

Furthermore, it is possible that the at least one virtual network entity comprises as entity network resources at least one external port through which the data packet flow is received for carrying out the service. The at least one network function is connected to the virtual network entity through the at least one network function port. The assigning of software and network requirements can comprise the step of assigning flow rules containing at least one of the determined network requirements between the at least one external port and the at least one network function port. As discussed above in connection with FIG. 6, flow rules are generated for ports, such as the flow rule for network function 200b between ports 2 and 4.

The at least one network function can be connected to the virtual network element through two network function ports. The assigning of software and network requirements can comprise the step of assigning at least one the software and network requirements between the two network function ports. This can be seen in connection with FIG. 6b, the requirements assigned between ports 4 and 5

Furthermore, it is possible that at least two network functions are connected to the virtual network entity, wherein each of the at least two network functions is connected to the virtual network entity through at least one network function port. This determination of the flow rules comprises assigning flow rules containing at least one of the determined network requirements between at least one network function port of a first network function and at least one network function port of a second network function. By way of example, in FIG. 6b for the network component 200c the rules are provided for ports 5 and 6, i.e. between the ports of two different network functions.

Furthermore, the virtual network entity can comprise two external ports, wherein the determination of the flow rules comprises assigning flow rules containing at least one of the determined network requirements between the two external ports. By way of example, in the embodiment of FIG. 6a for entity 300 a flow rule between port 0 and port 1 could be provided.

Additionally, the virtual network entity can comprise an external link port through which the virtual network entity is connected to another virtual network entity, wherein assigning the requirements comprises assigning at least one of the requirements to said external link port. By way of example, in FIG. 6b virtual network entity 200a comprises port 1 via which it is connected to entity 200b, wherein a requirement is provided for this port.

Furthermore, software resources needed for carrying out the service can be determined, e.g. by accessing another database in which possibly software resource combinations are indicated for a required application of a service having certain bandwidth and delay requirements. Furthermore, the network resources needed for carrying out the service are determined and the determined software and network resources are assigned to the at least one virtual network entity.

The information about the virtual network entity including the entity computing resources and entity network resources may be received from a lower layer through a southbound interface.

Preferably, the determination is recursive determination, meaning in the present context that the northbound interface corresponds to the southbound interface.

The network orchestration entity can receive the information about the virtual network entity from a layer below and information about software requirements and network requirements from the layer above, wherein it's the resource orchestration entity's job to map the information received from the upper layer to the information received from the lower layer.

Furthermore, the received software resources and network resources to the virtual network resources are mapped to the virtual network topology of the network with the at least one virtual network entity. The virtual network topology network with the at least one virtual network entity is then provided to upper layer through the northbound interface and the description of the software requirements and the network requirements in view of the virtual network topology is then received from the upper layer.

To describe the interface between the virtualizers, the following high level YANG model was created which incorporates infrastructure reports as well as deployment requests (containing requirements).

```
module virtualizer {
    namespace "urn:unify:virtualizer";
    prefix "virtualizer";
    organization "ETH";
    contact "Robert Szabo <robert.szabo@ericsson.com>";
    revision 2015-05-07
    {
        description "Virtualizer's data model";
    }
    //========== REUSABLE GROUPS
    ==========================
    grouping id-name {
        leaf id { type string; }
        leaf name { type string;}
    }
    grouping id-name-type {
        uses id-name;
        leaf type {
            type string;
            mandatory true;
        }
    }
    // ------------ PORTS -------
    typedef port-ref {
        type string;
    }
    grouping port-sap-vxlan {
        leaf vxlan {type string;} // for example
        //   container vx_lan {
        //     leaf remote_ip { type string; }
        //     leaf local_ip { type string; }
        //     leaf tunnel_key { type uint32; }
        //   }
    }
    grouping port-type {
        leaf port_type {type string;} // TODO: enumerated
        choice port-type {
            description "Different port types: abstract and SAPs";
            case port-abstract {
                leaf capability { type string; }
            }
            case port-sap {
                choice sap-type {
                    case vx-lan { // for example
                        uses port-sap-vxlan;
                    }
                }
            }
        }
    }
    grouping port {
        uses id-name;
        uses port-type;
    }
    // ------------ FLOW CONTROLS -------
    grouping flowentry {
        leaf port {
            type port-ref;
            mandatory true;
        }
        leaf match {
            type string;
            mandatory true;
        }
        leaf action {
            type string;
            mandatory true;
        }
        container resources{
            uses link-resource;
        }
    }
    grouping flowtable {
        container flowtable {
            list flowentry {
                key "port match action";
                uses flowentry;
            }
        }
    }
    // ------------ LINKS  -------
    grouping link-resource {
        leaf delay {
            type string;
            mandatory false;
        }
        leaf bandwidth {
            type string;
            mandatory false;
        }
    }
    grouping link {
        uses id-name;
        leaf src {
            type port-ref;
        }
        leaf dst {
            type port-ref;
        }
        container resources{
            uses link-resource;
        }
    }
    grouping links {
        container links {
            list link {
                key "src dst";
                uses link;
            }
        }
    }
    // ---------- CAPABILITIES ------------------
    grouping capabilities {
        container supported_NFs { // if supported NFs are enumerated
            list node{
                key "id";
                uses node;
            }
        }
        // TODO: add other capabilities
    }
    // ---------- NODE ------------------
    grouping software-resource {
        leaf cpu {
            type string;
            mandatory true;
        }
        leaf mem {
            type string;
            mandatory true;
        }
        leaf storage {
```

```
            type string;
            mandatory true;
        }
    }
    grouping node {
        description "Any node: infrastructure or NFs";
        uses id-name-type;
        container ports {
            list port{
                key "id";
                uses port;
            }
        }
        uses links;
        container resources{
            uses software-resource;
        }
    }
    grouping infra-node { // they can contain other
nodes (as NFs)
        uses node;
        container NF_instances {
            list node{
                key "id";
                uses node;
            }
        }
        container capabilities {
            uses capabilities;
        }
        uses flowtable;
    }
//======================= NF-FG: Virtualizer and
the Mapped request ============================
    container virtualizer {
        description "Container for a single virtualizer";
        uses id-name;
        container nodes{
            list node{ // infra nodes
                key "id";
                uses infra-node;
            }
        }
        uses links; // infra links
    }
}
```

Certain embodiments of the invention support a multi-level virtualizing/orchestration. Furthermore, it provides support of joint operation over software and network resources. Additionally, it allows the mapping of requirements to infrastructure elements or the sending of a constraint to a lower domain instead of mapping to specific elements. This makes it possible to avoid a too early and thus suboptimal mapping to the infrastructure. By way of example in FIG. 6a there is no need to split the 40 ms budged between the network functions in advance, only a requirement on the sum of them is formulated.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for assigning, by a resource orchestration entity, resources for a service carried out on a data packet flow in a multilayer network, wherein the multilayer network comprises a plurality of virtualization layers, the method comprising, at each virtualization layer:
   determining software requirements and network requirements necessary for the service, wherein the software requirements and the network requirements are received by the resource orchestration entity from an upper virtualization layer in the multilayer network through a northbound interface,
   determining a virtual network topology, of the multilayer network, with at least one virtual network entity, wherein the at least one virtual network entity comprises entity computing resources and entity network resources,
   assigning the software requirements and the network requirements at least partially to the entity computing resources and the entity network resources,
   determining software resources and network resources needed for carrying out the service, wherein the software resources and the network resources are received by the resource orchestration entity from a lower virtualization layer in the multilayer network through a southbound interface, and
   assigning the determined software and network resources to the at least one virtual network entity.

2. The method according to claim 1, wherein assigning the software requirements and the network requirements comprises determining flow rules for the entity network resources of the at least one virtual network entity needed for carrying out the service, and wherein the determined flow rules contain at least some of the determined network requirements.

3. The method according to claim 2, wherein the at least one virtual network entity comprises at least one external port through which the data packet flow is received for carrying out the service, wherein at least one network function is connected to the at least one virtual network entity through at least one network function port, and wherein assigning the software requirements and the network requirements comprises assigning the flow rules containing at least one of the determined network requirements between the at least one external port and the at least one network function port.

4. The method according to claim 2, wherein at least two network functions connected to the at least one virtual network entity are provided, each of the at least two network functions being connected to the at least one virtual network entity through at least one network function port, and wherein determining the flow rules comprises assigning the flow rules containing at least one of the determined network requirements between the at least one network function port of a first network function and the at least one network function port of a second network function.

5. The method according to claim 2, wherein the at least one virtual network entity comprises two external ports, and wherein determining the flow rules comprises assigning the flow rules containing at least one of the determined network requirements between the two external ports.

6. The method according to claim 1, wherein at least one network function is connected to the at least one virtual network entity, and wherein assigning the software requirements and the network requirements comprises assigning the software requirements at least partially to the at least one network function.

7. The method according to claim 6, wherein the at least one network function is connected to the at least one virtual network entity through two network function ports, and wherein assigning the software requirements and the network requirements comprises assigning at least one of the software requirements and the network requirements between the two network function ports.

8. The method according to claim 1, wherein the at least one virtual network entity comprises an external link port through which the at least one virtual network entity is connected to another virtual network entity, and wherein assigning the software requirements and the network requirements comprises assigning at least one of the software requirements and the network requirements to said external link port.

9. The method according to claim 1, wherein the network requirements comprise at least one of a delay requirement and a bandwidth requirement needed for carrying out the service.

10. The method according to claim 1, wherein the northbound interface corresponds to the southbound interface.

11. The method according to claim 1, wherein the received software resources and the received network resources are mapped to the virtual network topology of the multilayer network with the at least one virtual network entity, further comprising:
providing the virtual network topology with the at least one virtual network entity to the upper virtualization layer through the northbound interface, and
receiving a description of the software requirements and the network requirements in view of the virtual network topology.

12. The method according to claim 1, wherein assigning the software requirements and the network requirements comprises determining global network requirements for the service not assigned to any of the entity network resources, and wherein the global network requirements are transmitted to the lower virtualization layer, in the multilayer network, as global network requirements.

13. A resource orchestration entity configured to assign resources for a service carried out on a data packet flow in a multilayer network, wherein the multilayer network comprises a plurality of virtualization layers, the resource orchestration entity comprising:
at least one processor configured to determine software requirements and network requirements necessary for the service, or/and an interface configured to receive the software requirements and the network requirements from an upper virtualization layer in the multilayer network,
wherein the at least one processor is further configured to determine a virtual network topology, of the multilayer network, with at least one virtual network entity, wherein the at least one virtual network entity comprises entity computing resources and entity network resources, wherein the at least one processor is further configured to assign the software requirements and the network requirements at least partially to the entity computing resources and the entity network resources,
wherein the at least one processor is further configured to determine software resources and network resources needed for carrying out the service, wherein the resource orchestration entity further comprises a southbound interface configured to receive the software resources and the network resources from a lower virtualization layer in the multilayer network, and
wherein the at least one processor is further configured to assign the determined software and network resources to the at least one virtual network entity.

14. The resource orchestration entity according to claim 13, wherein the at least one processor is configured, for assigning the software requirements and the network requirements, to determine flow rules for the entity network resources of the at least one virtual network entity needed for carrying out the service, and wherein the determined flow rules contain at least some of the determined network requirements.

15. The resource orchestration entity according to claim 14, wherein the at least one virtual network entity comprises at least one external port through which the data packet flow is received for carrying out the service, wherein at least one network function is connected to the at least one virtual network entity through at least one network function port, and wherein the at least one processor is configured to assign the flow rules containing at least one of the determined network requirements between the at least one external port and the at least one network function port.

16. The resource orchestration entity according to claim 14, wherein at least two network functions connected to the at least one virtual network entity are provided, each of the at least two network functions being connected to the at least one virtual network entity through at least one network function port, and wherein the at least one processor is configured to assign the flow rules containing at least one of the determined network requirements between the at least one network function port of a first network function and the at least one network function port of a second network function.

17. The resource orchestration entity according to claim 14, wherein the at least one virtual network entity comprises two external ports, and wherein the at least one processor is configured to assign the flow rules containing at least one of the determined network requirements between the two external ports.

18. The resource orchestration entity according to claim 13, wherein at least one network function is connected to the at least one virtual network entity, and wherein the at least one processor is configured to at least partially assign the software requirements to the at least one network function.

19. The resource orchestration entity according to claim 18, wherein the at least one network function is connected to the at least one virtual network entity through two network function ports, and wherein the at least one processor is configured to assign at least one of the software requirements and the network requirements between the two network function ports.

20. The resource orchestration entity according to claim 13, wherein the at least one virtual network entity comprises an external link port through which the at least one virtual network entity is connected to another virtual network entity, and wherein the at least one processor is configured to assign at least one of the software requirements and the network requirements to said external link port.

21. The resource orchestration entity according to claim 13, wherein the interface configured to receive the software requirements and the network requirements is a northbound interface, and wherein the southbound interface and the northbound interface correspond to each other.

22. A non-transitory computer-readable medium having stored thereon program code to be executed by at least one processor of a resource orchestration entity, wherein execution of the program code causes the at least one processor to:

determine software requirements and network requirements necessary for a service, wherein the software requirements and the network requirements are received by the resource orchestration entity from an upper virtualization layer in a multilayer network through a northbound interface, and wherein the service is carried on a data packet flow in the multilayer network that includes a plurality of virtualization layers, determine a virtual network topology, of the multilayer network, with at least one virtual network entity, wherein the at least one virtual network entity comprises entity computing resources and entity network resources, assign the software requirements and the network requirements at least partially to the entity computing resources and the entity network resources, determine software resources and network resources needed for carrying out the service, wherein the software resources and the network resources are received by the resource orchestration entity from a lower virtualization layer in the multilayer network through a southbound interface, and assign the determined software and network resources to the at least one virtual network entity.

* * * * *